Aug. 17, 1926.

1,596,679

E. J. MORTIMER

TOBACCO PIPE

Filed Nov. 13, 1924

Inventor:
Ernest James Mortimer,
By his Atty,
Harold D. Penney

Patented Aug. 17, 1926.

1,596,679

UNITED STATES PATENT OFFICE.

ERNEST JAMES MORTIMER, OF BEDFORD, ENGLAND.

TOBACCO PIPE.

Application filed November 13, 1924, Serial No. 749,673, and in Great Britain September 26, 1924.

This invention relates to tobacco pipes and refers particularly to wooden pipes provided with vulcanite mouthpieces.

In tobacco pipes, such as just above referred to, a sliding spigot and socket joint is used, the mouthpiece having a smooth spigot which fits friction tight into a socket upon the wooden stem. Such joints are subject to various disadvantages. For example the wood may swell and bind upon the spigot thus preventing ready detachment from the mouthpiece, and sometimes leading to breakage, or on the other hand the wood may wear away or contract, thus causing a loose joint.

The present invention has for its object certain improvements designed to overcome the aforesaid disadvantages.

According to this invention the wooden stem is provided with a permanent socket piece for the mouthpiece, formed of vulcanite or other suitable substance whereby any direct detachable connection between the wooden stem of the pipe and the mouthpiece is avoided.

The invention further provides means whereby the correct position of the mouthpiece with regard to the pipe bowl is indicated so that the bowl is not, so to speak, twisted with regard to said mouthpiece.

In order that the invention may be the better understood drawings are appended in which:—

Figure 1:
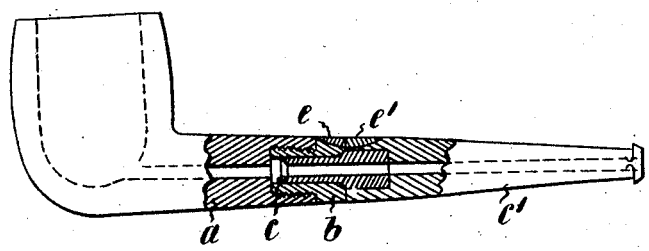
Fig. 1 is a longitudinal section of a tobacco pipe embodying the present invention.
Figure 2:
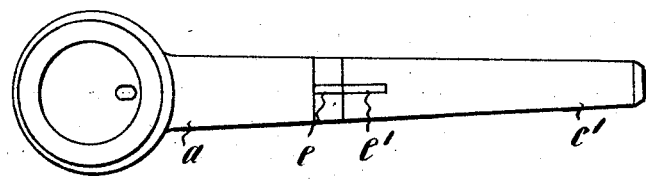
Fig. 2 is a plan of the pipe.

Referring to the accompanying drawings $a$ indicates the stem of the pipe to the end of which is applied a vulcanite socket piece, indicated by $b$, the connection of the said socket piece to the stem being effected either by screwing said socket, as shown, to the stem together with a suitable cement or adhesive, or the connection may be effected in any other suitable manner.

$c$ indicates the spigot of the mouthpiece which fits friction tight within the socket piece $b$ said spigot either forming an integral part of or being secured in any suitable manner to the mouthpiece $c^1$ in the usual manner, it being customary to form the spigot portion of the mouthpiece of some material which is less brittle than the mouthpiece itself, for example vulcanite having the desired physical characteristics.

In order to ensure the replacement of the mouthpiece in the proper position with respect to the stem after removing it for cleaning or other purposes, there are provided upon the socket and stem respectively short pieces of material $e$, $e^1$, of such colour that they may be readily distinguished and which are so placed upon the respective parts that when aligned the bowl and mouthpiece occupy their desired positions one with regard to the other. The shape of the pieces $e$, $e^1$, may be varied as desired but for convenience of production they are as shown, as by this means the socket piece and mouthpiece may be turned from one piece of material. A cut is made by means of a circular saw and a segmental piece of coloured material, white vulcanite for example, is inserted and secured within the cut. The end of the material is then cut off upon a line at or near the centre of the inserted vulcanite, the socket part finished for insertion in the stem, and the mouthpiece provided with the spigot.

When applying the socket to the pipe stem the parts are preferably at different temperatures so that advantage may be taken of the shrinkage or contraction of the wood to aid in retaining the socket.

Whilst throughout the foregoing description the invention is described as applied to wood and vulcanite pipes, it will be understood that it may also be employed upon pipes formed of other materials.

Claims.

1. In a tobacco pipe, a bowl, a stem on the bowl having a recess therein communicating with the bore of the stem, a socket having an end portion received in said recess and having an annular shoulder adjoining said end portion and abutting the end face of the stem when said end portion is received in said recess of the stem, said end portion and shoulder having an alined opening therethrough, a mounthpiece having at one end a spigot engageable in said opening and having at its opposite end a bit, a recess in said shoulder, a recess in the mouthpiece alinable with the recess of the shoulder when said spigot is engaged in said opening of the end portion and shoulder of the socket, and a strip of visual material in said recess of the shoulder and a strip of visual material in said recess of the mouthpiece for indicating by alinement of the strips that the bit of the mouthpiece lies in a plane at a right angle to the plane of the axis of the bowl of the pipe when said spigot is engaged in said opening of the end portion and annular shoulder of the socket.

2. In a tobacco pipe, a bowl, a stem on the bowl having a recess therein communicating with the bore of the stem, a socket having an end portion received in said recess and having an annular shoulder adjoining said end portion and abutting the end face of the stem when said end portion is received in said recess of the stem, said end portion and shoulder having an alined opening therethrough, a mouthpiece having at one end a spigot engageable in said opening and having at its opposite end a bit, a recess of segment of a circle shape in said shoulder, a recess of segment of a circle shape in the mouthpiece and alinable with said recess of the shoulder where said spigot is engaged in said opening of the end portion and shoulder of the socket, and a strip of visual material of segment of a circle shape in the recess of the shoulder and a strip of visual material of segment of a circle shape in the recess of the mouthpiece for indicating by alinement of the strips that the bit of the mouthpiece lies in a plane at a right angle to the plane of the axis of the bowl when said spigot is engaged in said opening of the end portion and annular shoulder of the socket.

In testimony whereof I have hereunto set my hand.

ERNEST JAMES MORTIMER.